United States Patent [19]

Strader et al.

[11] Patent Number: 5,799,645
[45] Date of Patent: Sep. 1, 1998

[54] CLEANING METHODS AND APPARATUS FOR RANGE GRILL UNITS

[75] Inventors: Michael A. Strader, Indianapolis; Joanne Stillman, Noblesville, both of Ind.

[73] Assignee: Maytag Corporation, Newton, Iowa

[21] Appl. No.: 659,712

[22] Filed: Jun. 10, 1996

[51] Int. Cl.⁶ ........................... F24C 3/00
[52] U.S. Cl. .................. 126/39 R; 126/51; 99/425
[58] Field of Search ............... 126/39 R, 51; 99/425; 165/444, 95; 15/373, 93.11

[56] References Cited

U.S. PATENT DOCUMENTS

| | | |
|---|---|---|
| 2,345,480 | 3/1944 | Jones . |
| 2,691,369 | 10/1954 | Rutenber . |
| 2,766,683 | 10/1956 | Kanz . |
| 2,879,708 | 3/1959 | Cripe . |
| 3,098,477 | 7/1963 | Lotter . |
| 3,474,724 | 10/1969 | Jenn . |
| 3,805,688 | 4/1974 | Gvozdjak ............... 99/425 |
| 4,517,886 | 5/1985 | Bales ..................... 99/425 |
| 5,469,837 | 11/1995 | Chiang et al. ........... 126/299 R X |
| 5,575,639 | 11/1996 | Pearl, II ................. 165/95 X |

*Primary Examiner*—Larry Jones
*Attorney, Agent, or Firm*—Brinks Hofer Gilson & Lione

[57] ABSTRACT

A method and apparatus for cleaning grill range units and for removing accumulated grease and other obstacles blocking the grease-carrying conduits in their grease collection systems is provided for cooktops including a grill, a drip pan for collecting grease, a drain opening in the drip pan and a conduit leading from the drain opening to a grease collector. A method of cleaning a cooktop comprises the steps of providing a long semi-rigid but flexible drain cleaner having a length at least about equal to the length of, and a diameter smaller than the diameter of said conduit and inserting the drain cleaner into the drain opening and pushing the drain cleaner through the conduit to remove collected materials therefrom. In preferred methods and apparatus the drain cleaner can have a low thermal conductivity. For example, the drain cleaner can comprise a thermoplastic material such as a nylon rod which is both thermally and electrically insulating. In preferred embodiments, such a nylon rod can have a length of about 36 inches and a diameter of about 1/10 of an inch.

12 Claims, 3 Drawing Sheets

CLEANING METHODS AND APPARATUS FOR RANGE GRILL UNITS

The present invention relates to ranges having cooking grills and particularly to methods and apparatus for cleaning range grills having a drip pan, a grease collector, and a grease-carrying conduit that connects the drip pan and the grease collector.

BACKGROUND OF THE INVENTION

Cooking appliances incorporating cooking grills have been manufactured and sold for years. Cooking grills are particularly desirable when included as part of a kitchen range or counter-mounted cooktop.

When meats and other foods are cooked on a grill, the cooking generates grease run-off which makes a grease collection system very desirable, and various grease collection systems have been developed to deal with the problem. Typical grease collection systems for grill units include a drip pan under the grill unit, a grease collector and a conduit connecting an outlet of the drip pan and the grease collector. The drip pan initially collects the grease and directs it to an outlet coupled to the conduit which carries the grease to the grease collector. An exemplary grease collection system is illustrated in U.S. Pat. No. 4,517,886 to Bales. Bales discloses a grease collection system for ranges with grilling capability. Bales'grease collection system provides an easily accessible and removable grease collector, with a built-in window and overflow control, that can be hidden from view with the oven door closed.

While the grease collector in the Bales'system was located adjacent the top of the range, grilling ranges also include grease collector systems where the grease collector is located in the base of the range.

One problem encountered in grease collection systems is grease coagulation and accumulation in the grease-carrying conduit. This problem can be particularly vexing where the grease collector is located at the base of the range and the grease collection systems have long grease-carrying conduits where the grease has an opportunity to cool in the conduit before it reaches the grease collector.

SUMMARY OF THE INVENTION

The present invention provides a method and apparatus for cleaning grill range units and for removing accumulated grease and other obstacles blocking the grease-carrying conduits in their grease collection systems. As an improvement to a cooktop including a grill, a drip pan for collecting grease, a drain opening in the drip pan and a conduit leading from the drain opening to a grease collector, the present invention includes a long semi-rigid but flexible drain opener for the conduit. The drain opener has a smaller diameter and preferably a greater length than the conduit. In preferred methods and apparatus the drain cleaner can have a low thermal conductivity. For example, the drain opener can comprise a thermoplastic material such as a nylon rod which is both thermally and electrically insulating. In preferred embodiments, such a nylon rod can have a length of about 36 inches and a diameter of about 1/10 of an inch.

The present invention provides a method of cleaning a cooktop comprising the steps of providing a long semi-rigid but flexible drain cleaner having a length at least about equal to the length of, and a diameter smaller than the diameter of said conduit and inserting the drain cleaner into the drain opening and pushing the drain cleaner through the conduit to remove collected materials therefrom.

Other features at the invention will be apparent from the drawings and more detail description that follows.

DETAILED DESCRIPTION OF THE DRAWINGS

Figure 1:
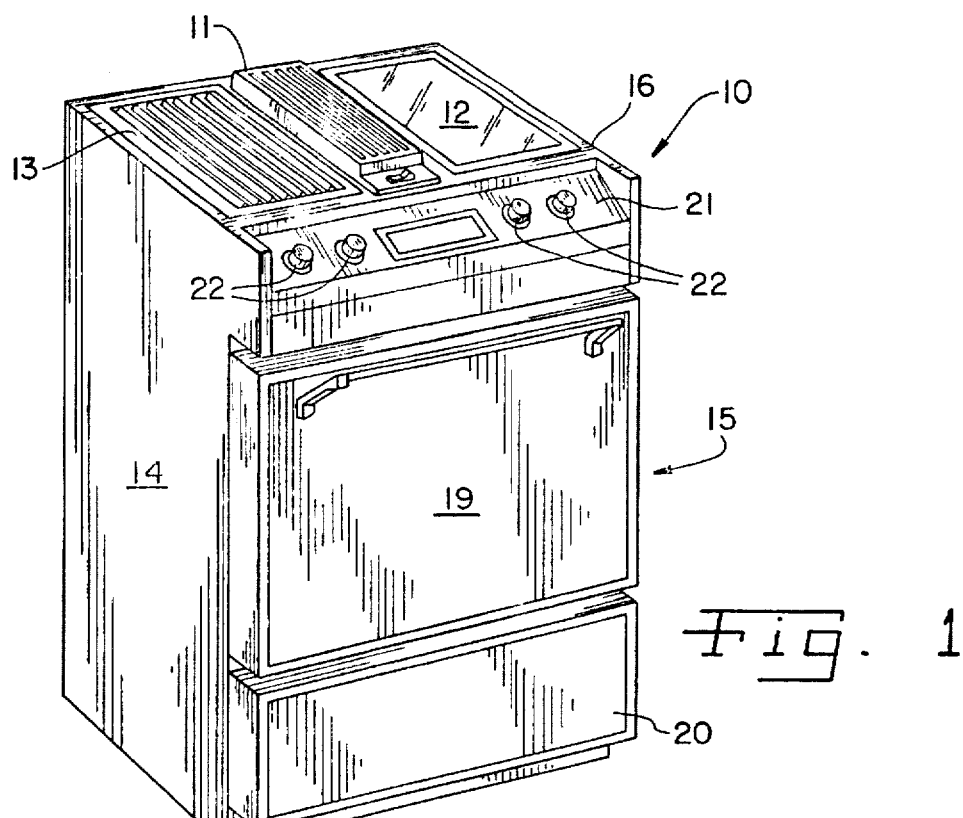
FIG. 1 is a perspective view of a cooktop appliance incorporating a cooking grill.

Referring now to the drawings and in particular to FIG. 1, there is shown a typical free-standing range or stove 10 of the type incorporating proximity ventilation and with a centrally located air intake 11. The range 10 shown in FIG. 1 utilizes interchangeable plug-in modular cooktop cartridges. These interchangeable cooktop cartridges are illustrated herein as a smooth cooktop unit 12 on the right and a grilling unit 13 on the left but can also include a variety of other cooking accessories as well as conventional heating elements.

Figure 2:
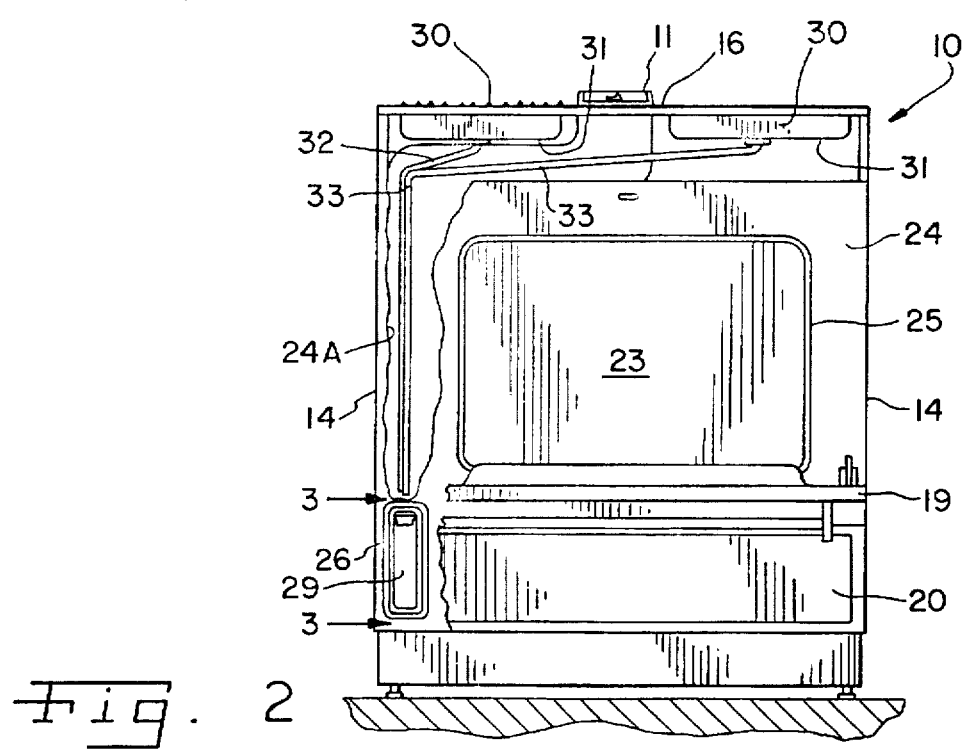
FIG. 2 is a front elevation of the appliance of FIG. 1 with the control panel removed, the oven door open and the front panel forming the oven opening partially broken away to reveal the grease-carrying conduits extending from the drip pans to the grease collector.

The range 10 as shown in FIGS. 1 and 2 includes a generally rectangular cabinet having substantially vertically disposed side and front panels 14 and 15 and a generally horizontally disposed top surface 16. The cabinet portion generally designated as front panel 15 is comprised of a forwardly opening oven door 19 and a forwardly opening drawer 20 which is disposed directly below the oven door 19. Also, as shown in FIG.1, a control panel 21 is generally associated with the front panel 15 and includes a plurality of knobs 22 for providing individual control and operation of the cooktop cartridges 12 and 13 and of the oven 23.

FIG. 2 shows the range 10 with the oven door 19 in the open posture and with the control panel 21 removed. The inner panel portion 24 of the range 10, shown in FIG. 2, includes a pair of openings 25 and 26. A large generally centrally located opening defines the oven cavity opening 25, and a substantially smaller secondary opening 26 is disposed in the lower left-hand corner of the inner panel portion 24 for receiving a grease collector 29 which is readily removable when the drawer 20 is open. When the drawer 20 is closed, the grease collector 29 is hidden from view. In FIG. 2 the forward face of panel 24 is cut away at 24A to show the grease carrying conduits 32, 33.

Figure 3:
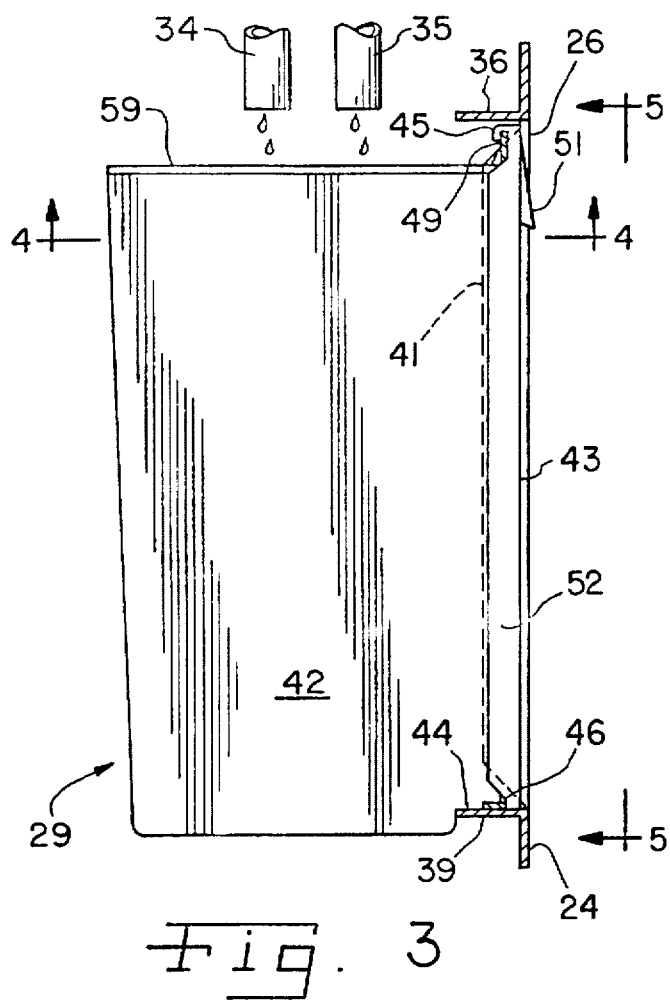
FIG. 3 is a fragmentary section view taken along lines 3—3 of FIG. 2.
Figure 4:
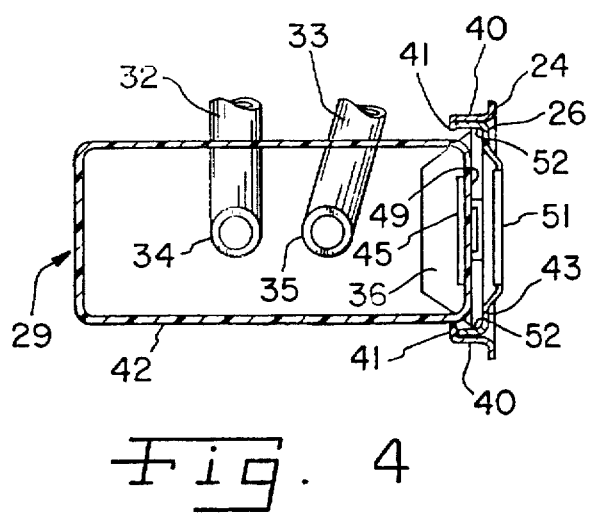
FIG. 4 is a section view taken along lines 4—4 of FIG. 3.

As best shown in FIG. 2, each of the cooktop cartridges 12 or 13 is supported on the top surface 16 overlying one of a pair of drip pans 30 on each side of the proximity ventilation air intake 11. The drip pans 30 are constructed so that their bottom surfaces 31 slope downwardly from the rear of the range 10 toward the front so that any grease generated by grilling food products will drain toward sump areas at the front of the drip pans 30. As further shown in FIG. 2, a conduit 32 extends from the sump area of the drip pan 30 under the grilling unit 13 on the left and has an outlet end 34 directly overlying the open top of the grease collector 29, as shown in FIGS. 3 and 4. The range may also be provided with a conduit 33 extending from the sump area of the drip pan 30 under the cooking cartridge 11 on the right of the range, as shown in FIG. 2, so the grilling unit 13 may be accommodated in either of the drip pans 30.

Figure 5:
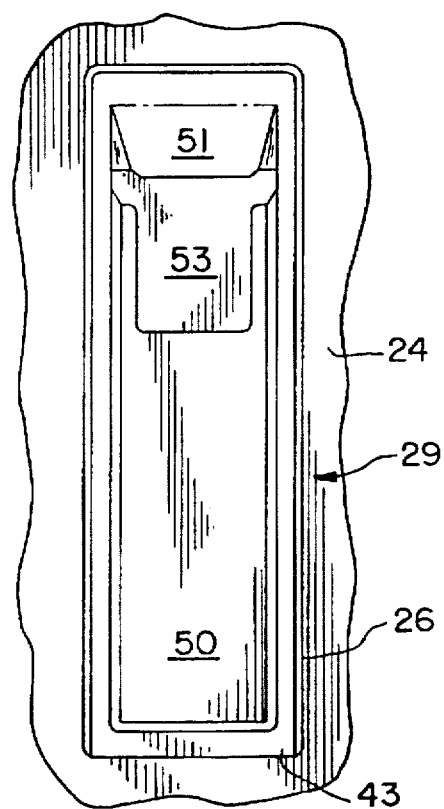
FIG. 5 is a view of the grease collector as normally mounted in the inner panel portion of the range.

As best shown in FIGS. 3–5, the secondary opening 26 in the inner panel portion 24 of the range 10 is a vertically elongated rectangular opening spaced below the outlet ends 34 and 35 of the conduits 32 and 33. The top and bottom edges of the opening 26 are fabricated to provide a pair of rearwardly extending flanges 36 and 39. Each of the vertically disposed sides 40 of the rectangular opening 26 extend rearwardly for a predetermined distance and then turn in to form a pair of rearwardly spaced flanges 41. The vertically elongated rectangular opening 26 thus includes upper and lower flanges 36 and 39 and a rearwardly spaced generally narrower opening defined by the flanges 41.

As further shown in FIGS. 3–5, the open top substantially rectangular grease collector, or container, 29 is mounted within the rectangular opening 26 for receiving grease generated when grilling foods. The grease collector 29 can be of a two-piece construction including a thermoplastic grease container 42 and a stainless steel front panel 43 which is visibly compatible with the material of the inner panel portion 24.

The thermoplastic grease container 42 includes a step portion 44 at its lower front corner, as best shown in FIG. 3, which is engageable with and rests upon the lower flange 39 of the rectangular opening 26 when inserted therein. The stainless steel front panel 43 is secured to the front of the grease container 42 by upper and lower tabs 45 and 46 which are bent over the top and bottom edges of the front wall 49 of the grease container 42 as shown in FIG. 3. The center section 50 of the front panel 43 is rearwardly formed to engage with the front wall 49 of the grease container 42. As shown in FIGS. 4 and 5, the upper portion of the front panel 43 extends forwardly to define a finger hold handle 51 for aiding installation and removal of the grease collector 29 from the rectangular opening 26. Each side wall 52 of the front panel 43 is rearwardly formed and, as shown in FIG. 4, contacts the pair of rearwardly spaced flanges 41. Therefore the combination of lower flange 39 and rearwardly spaced flanges 41 maintains the grease collector 29 properly disposed within the rectangular opening 26.

As best shown in FIG. 5, the stainless steel front panel 43 is removed above the rearwardly formed center section 50 and below the handle 51 to define a window sight gauge area 53. The particular thermoplastic material used for the grease container 42 is naturally translucent and the level of grease will be readily visible through the window or sight gauge area 53.

Figure 6:
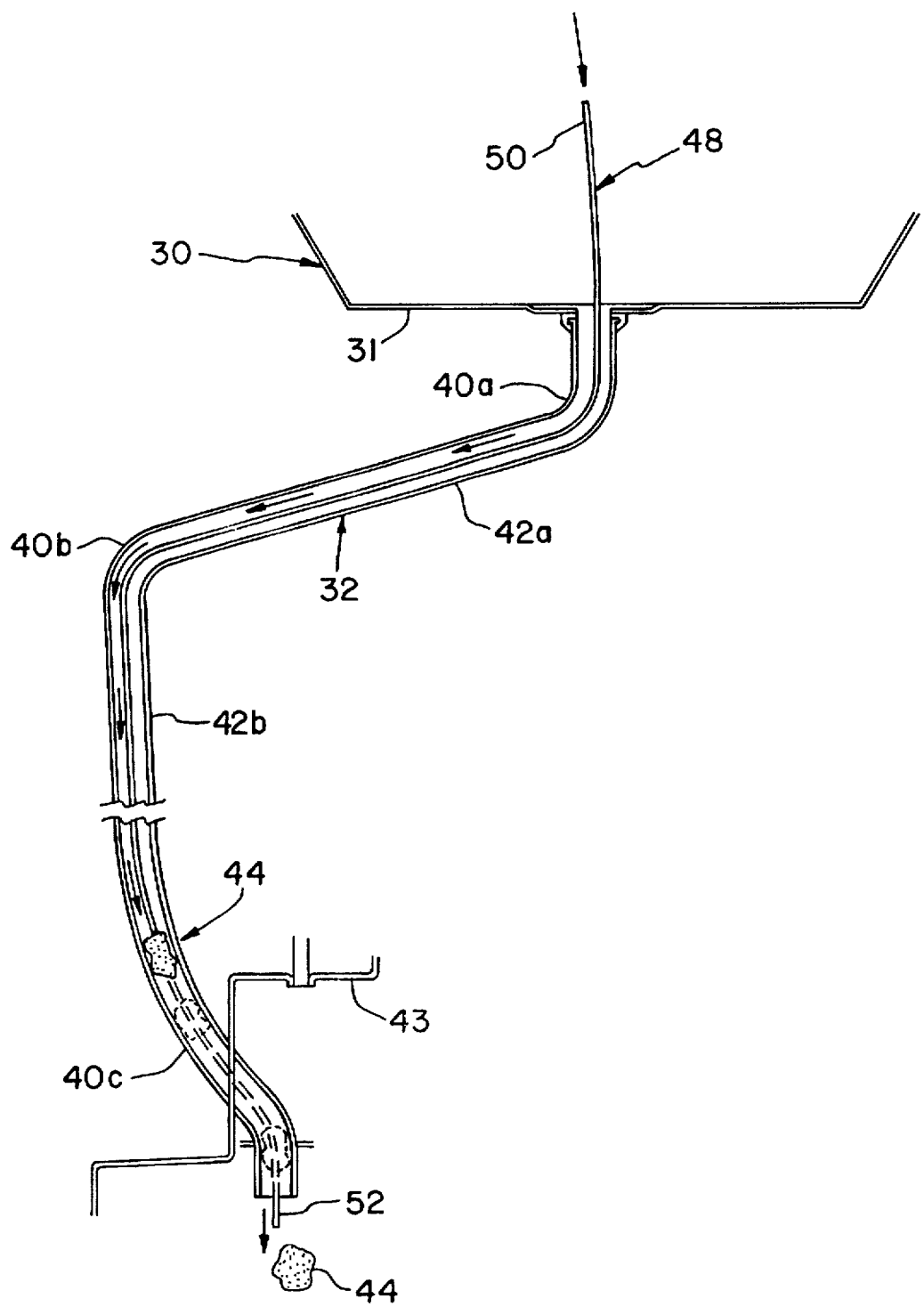
FIG. 6 is a view of the grease drain clean-out device positioned in the grease-carrying conduit and pushing an obstruction out of the conduit.

As shown in FIG. 2, conduits 32, 33 extend from the drip pans 30 across the top of the range interior and downwardly at the side of the range interior and terminate at openings 34, 35 immediately above the grease collection 42. Such conduits can have an inside diameter on the order of about 3/16 to about 1/8 inch. Referring to FIG. 6, the conduit 32, for example, is coupled to the bottom surface 31 of the drip pan 30 and allows a flow of grease from the sump area of the drip pan 30 to the grease collector 29. Based on the particular installation, the conduit 32 may have several bends 40a–c and straight portions 42a–b and can be supported by range structural members 43.

As the food is grilled, grease runs off the food, is caught by the drip pan and flows to the sump area at the front of the drip pan 30 and into the conduit 32. Because of the length of the conduits 32, 33, leading to near the base of the range, the grease can cool sufficiently that it loses its fluidity and coagulates while still in the conduit 32, forming an obstruction 44. Once an obstruction 44 begins to form in the conduit 32, it becomes more difficult for grease to flow through the conduit 32, and since, as a result, grease spends more time in the conduit 32, it is more likely to congeal in the conduit, thereby adding to the obstruction 44. Eventually, the obstruction 44 can grow to completely block the conduit 32.

The invention provides a method and apparatus for cleaning grill ranges to prevent obstructions and blockages in the grease collection system. In the method of the present invention, a drain opener 48 can be used for cleaning the grease collection system and for removing obstructions from the grease conduits. The drain opener 48 comprises a long, thin piece of a semi-rigid yet flexible material, preferably nylon, but other thermoplastic materials such as polypropylene or high density polyethylene can be used. A nylon rod having a length of about 36 inches and a diameter of about 1/10 inch provides both the rigidity and flexibility sufficient for the invention. Preferably, the drain opener 48 has low thermal conductivity whatever it is made of, or is provided with a thermally isolating grip. The drain opener 48 also preferably is electrically insulating. Preferred drain openers 48 are longer than the length of the conduits 32, 33 so that a user can hold onto a first end 50 while the other end 52 passes completely through the length of the conduit, clearing the obstructions along its entire length. The drain opener 48 can have any thickness or cross section appropriate to the particular installation, but a preferred nylon drain opener 48 has a circular cross section with a diameter of about 1/10 of an inch, preferably a diameter of 0.095 inch. The material used, the cross section and diameter will be chosen to provide sufficient rigidity to clear obstructions from the conduit 32 while retaining the flexibility necessary to negotiate the bends 40a–c in the conduit 32.

In cleaning range grills, such a drain opener 48 is inserted by hand into the drain opening of the drip pan and is then pushed through the conduit, and if necessary, more than once, to clear the conduit of obstructions.

Although the invention has been described and illustrated with the currently known best mode, as apparent to those skilled in the art, the invention is limited only by scope of the following claims and prior art.

We claim:

1. A cooktop including a cooking grill having at least one burner, a drip pan for collection of grease, a drain opening in said drip pan for removal of fluid grease from the drip pan, a conduit leading from said drain opening to a grease collector having a sufficient diameter that fluid grease will flow from said opening to said grease collector, and a long semi-rigid but flexible drain opener for said conduit having a greater length and a smaller diameter than said conduit for extending through substantially the entire length of said conduit as necessary to dislodge and remove collected materials including coagulated grease into said grease collector.

2. The cooktop of claim 1 wherein said drain opener has a low thermal and low electrical conductivity.

3. The cooktop of claim 1 wherein said drain opener comprises a thermoplastic material.

4. The cooktop of claim 3 wherein said drain opener comprises a flexible nylon rod having a length of about 36 inches and a diameter of about 1/10 of an inch.

5. A method of cleaning a cooktop including a cooking grill, a drip pan for collection of grease, a drain opening in said drip pan for removal of fluid grease from the drip pan, and a conduit leading from said drain opening to a grease collector and having a sufficient diameter that liquified grease will flow from said opening to said collector, the method comprising the steps of:

provviding a long semi-rigid but flexible drain cleaner having a length at least about equal to the length of, and a diameter smaller than the diameter of, said conduit, and inserting said drain cleaner into said drain opening and pushing said drain cleaner through said conduit along substantially the entire length of said conduit as necessary to dislodge and remove collected materials including coagulated grease therefrom.

6. The method of claim 5 further comprising the step of providing thermal insulation for a user's hand.

7. The method of claim 5 further comprising the step of providing said drain cleaner from an electrically insulative material having low thermal conductivity.

8. The method of claim 5 further comprising the step of forming said drain cleaner from a thermoplastic material.

9. The method of claim 8 wherein said drain cleaner is formed from a thin nylon rod.

10. In a cooktop including a cooking grill, a grill drip pan for collection of grease, a drain opening in said grill drip pan for removal of fluid grease from the grill drip pan, and a grease conduit leading from said grill drain opening to a grease collector, the improvement comprising a long semi-rigid but flexible thermoplastic rod having a greater length and a smaller diameter than said grease conduit for extending through substantially the entire length of said conduit as necessary to dislodge and remove collected materials including coagulated grease into said grease collector.

11. The cooktop of claim 10 wherein said plastic rod has a low thermal conductivity.

12. The cooktop of claim 10 wherein said plastic rod comprises a flexible nylon rod having a length of at least about 36 inches and a diameter of about $1/10$ of an inch.

* * * * *